(12) United States Patent
Sone

(10) Patent No.: US 11,764,601 B2
(45) Date of Patent: Sep. 19, 2023

(54) POWER SUPPLY SYSTEM

(71) Applicant: HONDA MOTOR CO., LTD., Tokyo (JP)

(72) Inventor: Toshihiro Sone, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/847,722

(22) Filed: Jun. 23, 2022

(65) Prior Publication Data

US 2022/0416561 A1 Dec. 29, 2022

(30) Foreign Application Priority Data

Jun. 25, 2021 (JP) .................................. 2021-105874

(51) Int. Cl.
*H02J 7/34* (2006.01)
*H02J 7/00* (2006.01)
*B60L 58/40* (2019.01)
*B60L 50/75* (2019.01)
*H02P 27/06* (2006.01)

(52) U.S. Cl.
CPC ................ *H02J 7/34* (2013.01); *B60L 50/75* (2019.02); *B60L 58/40* (2019.02); *H02J 7/0063* (2013.01); *H02P 27/06* (2013.01)

(58) Field of Classification Search
CPC . H02J 7/0063; H02J 7/34; B60L 50/75; B60L 58/40; H02P 27/06
USPC ........................................................ 307/142
See application file for complete search history.

(56) References Cited

U.S. PATENT DOCUMENTS

2004/0076860 A1* 4/2004 Aso ................... H01M 8/04388
429/430
2017/0244336 A1 8/2017 Kitamoto

FOREIGN PATENT DOCUMENTS

JP 2017-153242 A 8/2017

* cited by examiner

*Primary Examiner* — Hal Kaplan
(74) *Attorney, Agent, or Firm* — Paratus Law Group, PLLC

(57) ABSTRACT

A power supply system connected to a motor unit of an electric vehicle, the power supply system includes: a fuel cell; a secondary battery; a voltage control unit; and a switch. The fuel cell is directly connected to the motor unit, the secondary battery is connected to the motor unit via the voltage control unit, and the switch is configured to switch between a first state in which the secondary battery and the voltage control unit are connected in parallel with the fuel cell and a second state in which the secondary battery and the voltage control unit are connected in series with the fuel cell.

3 Claims, 9 Drawing Sheets

POWER SUPPLY SYSTEM

CROSS-REFERENCE TO RELATED APPLICATIONS

The present application claims the benefit of priority of Japanese Patent Application No. 2021-105874, filed on Jun. 25, 2021, the content of which is incorporated herein by reference.

TECHNICAL FIELD

The present invention relates to a power supply system including a fuel cell and a secondary battery.

BACKGROUND ART

In recent years, there has been an increasing interest in development of automobiles that contribute to $CO_2$ reduction from a viewpoint of climate-related disasters, and an electric vehicle including a fuel cell and a secondary battery that are a power supply of a driving motor is known. For example, JP-A-2017-153242 discloses an electric vehicle including a fuel cell and a secondary battery connected in parallel, and a voltage control unit provided at an output terminal of each of the fuel cell and the secondary battery. In such a configuration, since an output power from each of the fuel cell and the secondary battery can be boosted, a large drive output can be obtained.

However, in the configuration of JP-A-2017-153242, there is a problem that manufacturing cost increases or a weight increases by providing the voltage control unit in each of the fuel cell and the secondary battery.

In contrast, a configuration is conceivable in which a voltage control unit is provided in one of the fuel cell and the secondary battery. However, since the voltage control unit operates so as to match voltages of respective output powers from the fuel cell and the secondary battery, a voltage of drive power supplied to the driving motor is an output voltage of a power supply of the fuel cell or the secondary battery in which the voltage control unit is not provided. Since the voltage decreases as the output power of the power supply increases, there is a problem that a voltage of the driving motor is insufficient and it is difficult to obtain large motive power.

When a power supply provided with the voltage control unit among the fuel cell and the secondary battery is a main energy source for driving a vehicle, energy transmitted via the voltage control unit increases, and thus an energy efficiency of the electric vehicle decreases due to a loss generated in the voltage control unit. Since a circuit scale of the voltage control unit provided in the power supply as the main energy source for driving the vehicle is increased, there is a problem that manufacturing cost is increased or a weight is increased in this respect as well.

In particular, in a configuration in which the voltage control unit is provided only in the fuel cell, there is a problem that the output voltage from the fuel cell is always boosted and the energy efficiency of the electric vehicle is reduced in addition to the problem that the manufacturing cost is increased and the weight is increased as described above. In this configuration, since a voltage of drive power supplied to the driving motor is an output voltage of the secondary battery, the voltage of the driving motor is insufficient and it is difficult to obtain large motive power compared to the configuration in which the voltage control unit is provided in each of the fuel cell and the secondary battery.

In contrast, it is also conceivable to provide a voltage control unit in the secondary battery and not to provide a voltage control unit in the fuel cell. However, in such a configuration, since the voltage of the drive power supplied to the driving motor is the output voltage of the fuel cell, the voltage of the driving motor is insufficient, and it is difficult to obtain a large output.

SUMMARY

The present invention provides a power supply system capable of improving supply performance of drive power while suppressing an increase in manufacturing cost and weight.

According to an aspect of the present invention, there is provided a power supply system connected to a motor unit of an electric vehicle, the power supply system including: a fuel cell; a secondary battery; a voltage control unit; and a switch, where: the fuel cell is directly connected to the motor unit; the secondary battery is connected to the motor unit via the voltage control unit; and the switch is configured to switch between a first state in which the secondary battery and the voltage control unit are connected in parallel with the fuel cell and a second state in which the secondary battery and the voltage control unit are connected in series with the fuel cell.

According to the present invention, it is possible to improve supply performance of drive power while suppressing an increase in manufacturing cost and weight.

DESCRIPTION OF EMBODIMENTS

Hereinafter, an embodiment of a power supply system of the present invention will be described with reference to the accompanying drawings.

<Schematic Configuration of Electric Vehicle 1 on which Power Supply System 100 of Embodiment of Present Invention is Mounted>

Figure 1:
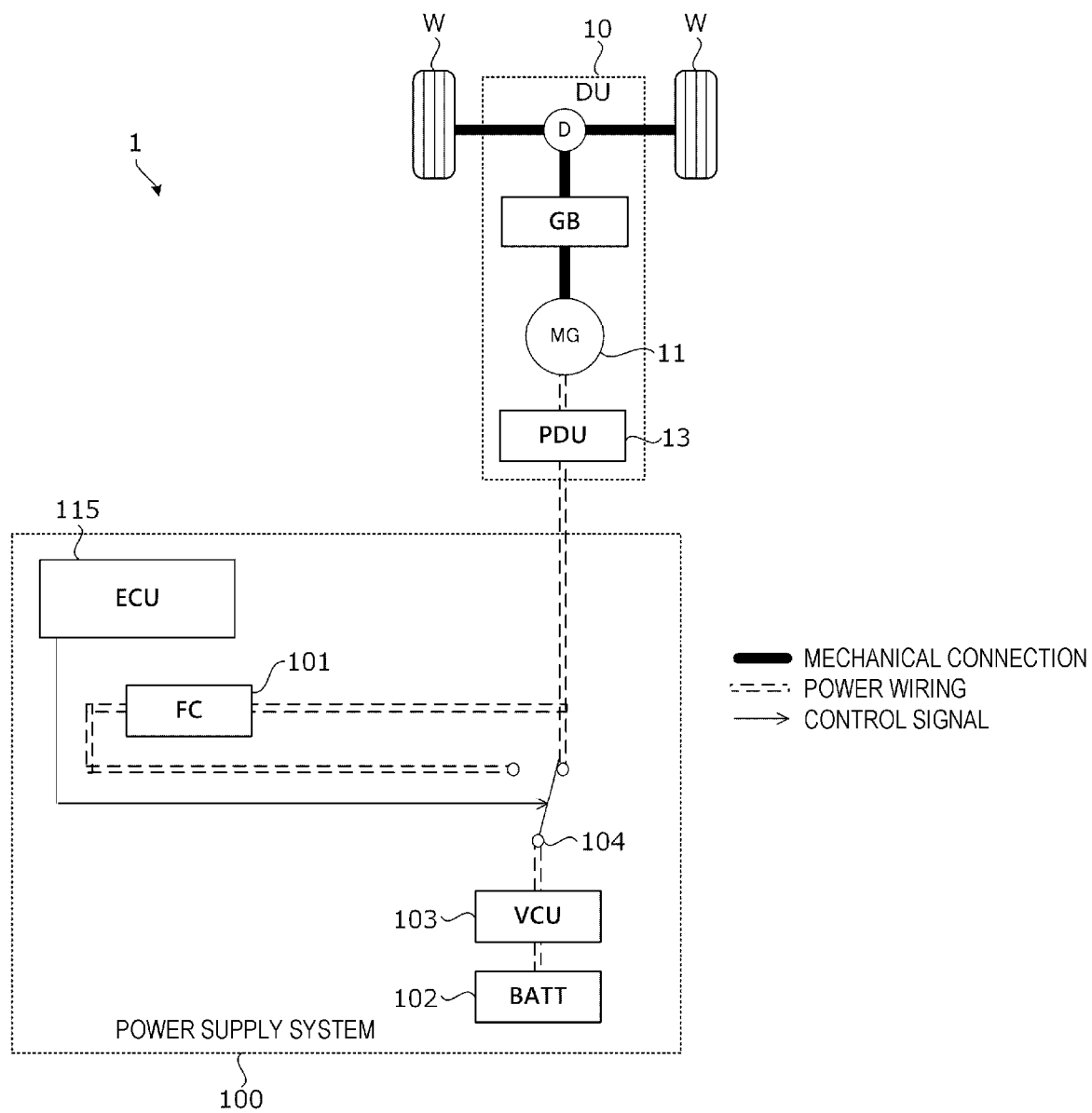
FIG. 1 is a block diagram showing a schematic configuration of an electric vehicle 1 on which a power supply system 100 of an embodiment of the present invention is mounted.
Figure 2:
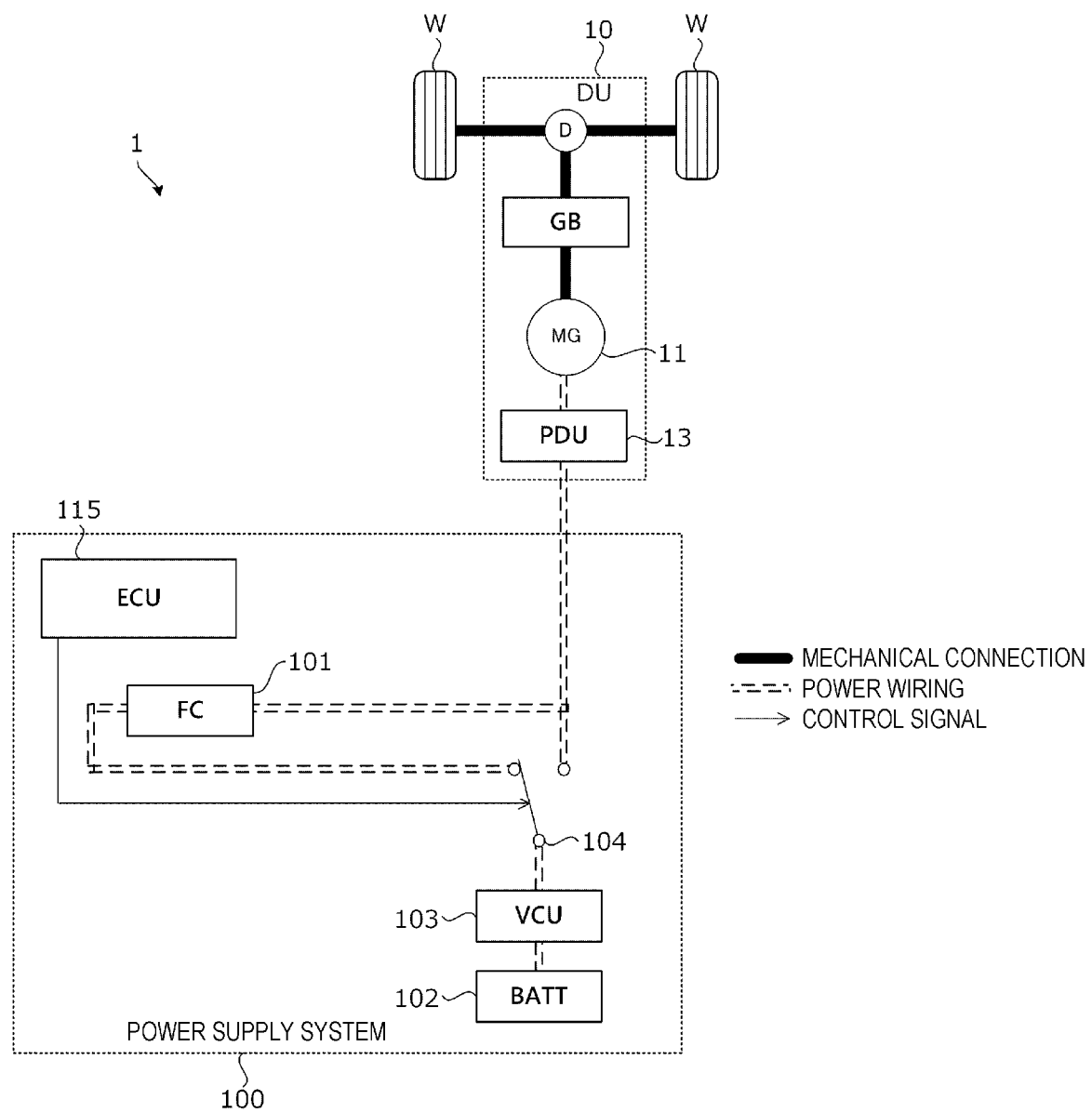
FIG. 2 is a block diagram showing the schematic configuration of the electric vehicle 1 on which the power supply system 100 of the embodiment of the present invention is mounted.

FIGS. 1 and 2 are block diagrams showing the schematic configuration of the electric vehicle 1 on which the power supply system 100 of the embodiment of the present invention is mounted. In FIGS. 1 and 2, a thick solid line indicates mechanical connection, a double broken line indicates power wiring, and a thin solid arrow indicates a control signal. The electric vehicle 1 shown in FIGS. 1 and 2 is a 1MOT type electric vehicle including a driving unit (DU) 10 and a power supply system 100.

The DU 10 includes a drive wheel W, a gear box GB, a differential gear D, a motor generator (MG) 11, and a power drive unit (PDU) 13.

The motor generator 11 is an example of a motor unit of the electric vehicle 1, which is driven by drive power supplied from the power supply system 100 and generates motive power (torque) for the electric vehicle 1 to travel. The motive power generated by the motor generator 11 is transmitted to the drive wheel W via a gear box GB including a variable transmission or a fixed transmission and the differential gear D. The motor generator 11 operates as a generator during deceleration of the electric vehicle 1 and outputs a braking force of the electric vehicle 1. Regenerative power generated by operating the motor generator 11 as a generator is stored in a secondary battery 102 of the power supply system 100.

The PDU 13 converts a DC voltage into an AC voltage and applies the AC voltage to the motor generator 11. The PDU 13 converts an AC voltage input during a regenerative operation of the motor generator 11 into a DC voltage.

The power supply system 100 can perform a driving operation of supplying drive power from the power supply system 100 to the motor generator 11 to generate motive power of the electric vehicle 1 and a regenerative operation of storing regenerative power from the motor generator 11 in the secondary battery 102. Hereinafter, the driving operation will be mainly described as an operation of the power supply system 100. Terms "input" and "output" are used with reference to a flow of drive power in the driving operation of the power supply system 100.

The power supply system 100 includes a fuel cell (FC) 101, a secondary battery (BATT) 102, a voltage control unit (VCU) 103, and an electronic control unit (ECU) 115.

The fuel cell 101 includes a hydrogen tank, a hydrogen pump, and an FC stack. The hydrogen tank stores hydrogen that is fuel for the electric vehicle to travel. The hydrogen pump adjusts an amount of hydrogen sent from the hydrogen tank to the FC stack. The hydrogen pump can also adjust a humidification amount of hydrogen by supplying dried hydrogen stored in the hydrogen tank to the FC stack via a water tank in the hydrogen pump. The FC stack takes in hydrogen supplied from the hydrogen pump and oxygen in the air, and generates electric energy by a chemical reaction. The electric energy generated by the FC stack is supplied to the DU 10 or the secondary battery 102.

As the fuel cell 101, in addition to a polymer electrolyte fuel cell (PEFC), various types of fuel cells such as a phosphoric acid fuel cell (PAFC), a molten carbonate fuel cell (MCFC), and a solid oxide fuel cell (SOFC) can be applied. A closed circuit voltage of the fuel cell 101 varies according to a discharge amount.

The secondary battery 102 includes a plurality of power storage cells such as a lithium-ion battery and a nickel-metal hydride battery, and supplies the drive power to the motor generator 11 via the voltage control unit 103. The secondary battery 102 is not limited to a secondary battery such as a lithium-ion battery or a nickel-metal hydride battery. For example, although a storage capacity is small, a capacitor capable of charging and discharging a large amount of electric power in a short time may be used as the secondary battery 102.

The voltage control unit 103 is a voltage control unit that steps down an output voltage of the secondary battery 102 while keeping a direct current. The voltage control unit 103 is also called a DC/DC converter.

Characteristics of the fuel cell 101 and characteristics of the secondary battery 102 are different from each other. The fuel cell 101 can continuously discharge a large current as long as hydrogen and oxygen as fuel are supplied. However, in principle of generating electricity by an electrochemical reaction of supplied fuel gas, it is difficult to discontinuously change output power of the fuel cell 101 in a short time. In consideration of these characteristics, it can be said that the fuel cell 101 has characteristics as a high-capacity power supply. In contrast, in the secondary battery 102, in principle of generating electricity by an electrochemical reaction of an internal active material, it is difficult to continuously discharge a large current, but it is not difficult to discontinuously change an output of the secondary battery 102 in a short time. In consideration of these characteristics, it can be said that the secondary battery 102 has characteristics as a high-output power supply.

The fuel cell 101 is directly connected to the motor generator 11. "Directly connected to the motor generator 11" means, for example, "connected to the motor generator 11 without a voltage control unit (VCU)". In the example of FIGS. 1 and 2, the fuel cell 101 is connected to the motor generator 11 via the PDU 13 instead of via the voltage control unit.

The secondary battery 102 is connected to the motor generator 11 via the voltage control unit 103. That is, an input terminal of the voltage control unit 103 is connected to the secondary battery 102, and an output terminal of the voltage control unit 103 is connected to the motor generator 11. In the example of FIG. 1, the secondary battery 102 is connected to the motor generator 11 via the voltage control unit 103, the switch 104, and the PDU 13. In the example of FIG. 2, the secondary battery 102 is connected to the motor generator 11 via the voltage control unit 103, the switch 104, the fuel cell 101, and the PDU 13.

The switch 104 is a switch capable of switching the power supply system 100 between a first state and a second state. As shown in FIG. 1, the first state is a state in which the secondary battery 102 and the voltage control unit 103 are connected in parallel with the fuel cell 101. As shown in FIG. 2, the second state is a state in which the secondary battery 102 and the voltage control unit 103 are connected in series with the fuel cell 101.

Specifically, as shown in FIG. 1, the switch 104 switches the power supply system 100 to the first state by connecting the output terminal of the voltage control unit 103 between the DU 10 and the fuel cell 101. The switch 104 switches the power supply system 100 to the second state by connecting the output terminal of the voltage control unit 103 to the fuel cell 101. The switch 104 is, for example, a magnet switch, and switching of the switch 104 is controlled by an ECU 115.

In the first state, since the secondary battery 102 and the voltage control unit 103 are connected in parallel with the fuel cell 101, a voltage of the drive power supplied to the motor generator 11 decreases. The first state may be referred to as an "FC direct connection mode".

In the second state, since the secondary battery 102 and the voltage control unit 103 are connected in series with the fuel cell 101, the voltage of the drive power supplied to the motor generator 11 increases. The second state may be referred to as a "voltage boost mode" or the like.

The ECU 115 is a control circuit that performs various controls in the electric vehicle 1. Specifically, the control performed by the ECU 115 includes a switching control of the switch 104. The control performed by the ECU 115 may include controls of the fuel cell 101, the PDU 13, and the like.

For example, the ECU 115 controls the switch 104 to switch between the first state and the second state based on a required output value for the motor generator 11. The required output value for the motor generator 11 is set by the ECU 115, for example, based on an operation from a driver of the electric vehicle 1 (for example, an amount of operation on an accelerator pedal of the electric vehicle 1) and a traveling speed of the electric vehicle 1. The ECU 115 may use information on a road on which the electric vehicle 1 is traveling or the like to set the required output value for the motor generator 11.

Specifically, the ECU 115 controls the switch 104 to be in the first state when the required output value for the motor generator 11 is less than a predetermined value. Accordingly, when the required output value for the motor generator 11 is not large, the secondary battery 102 and the voltage control unit 103 can be connected in parallel to the fuel cell 101 to supply low-voltage drive power to the DU 10.

The ECU 115 controls the switch 104 to be in the second state when the required output value for the motor generator 11 is equal to or greater than the predetermined value. Accordingly, when the required output value for the motor generator 11 is large, the secondary battery 102 and the voltage control unit 103 can be connected in series to the fuel cell 101 to supply high-voltage drive power to the DU 10, and large motive power can be generated in the motor generator 11.

As shown in FIGS. 1 and 2, in the power supply system 100, the voltage control unit that boosts the output power from the fuel cell 101 is not provided, so that the manufacturing cost and the weight of the power supply system 100 can be suppressed.

The power supply system 100 further includes the switch 104 capable of switching between the first state in which the fuel cell 101 is connected in parallel to the secondary battery 102 and the voltage control unit 103 and the second state in which the fuel cell 101 is connected in series to the secondary battery 102 and the voltage control unit 103.

Accordingly, even in the configuration in which the voltage control unit that boosts the output power from the fuel cell 101 is not provided, when the required output value is large, it is possible to supply the high-voltage drive power by switching to the second state. When the required output value is not high, it is possible to supply the low-voltage drive power to the DU 10 by switching to the first state. At this time, since the output voltage from the fuel cell 101 is not always boosted by the voltage control unit, the energy efficiency can be improved. That is, in accordance with the required output value, it is possible to supply the high-voltage drive power or supply the drive power with high energy efficiency, and it is possible to improve the supply performance of the drive power of the power supply system 100.

<Characteristics of DU 10>

Figure 3:
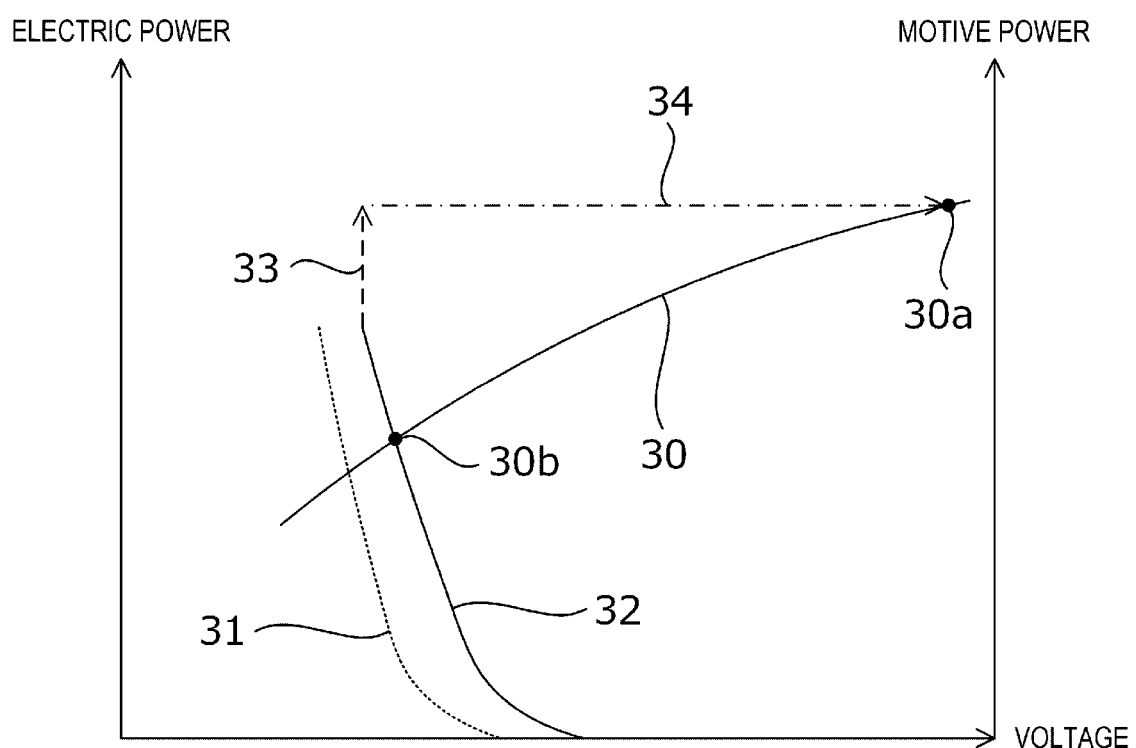
FIG. 3 is a graph showing an example of characteristics of DU 10.

FIG. 3 is a graph showing an example of characteristics of the DU 10. A horizontal axis of FIG. 3 indicates the voltage of the drive power supplied to the DU 10. A left vertical axis of FIG. 3 indicates electric power of the drive power supplied to the DU 10. A right vertical axis of FIG. 3 indicates motive power (torque) of the electric vehicle 1 generated by the DU 10.

A DU characteristic 30 indicates a characteristic of the motive power of the electric vehicle 1 generated by the DU 10 with respect to the voltage of the drive power supplied to the DU 10. As indicated by the DU characteristic 30, the higher the voltage of the drive power supplied to the DU 10, the larger the motive power of the electric vehicle 1 can be obtained. A maximum rating 30a is a maximum rating in the DU characteristic 30, and a continuous rating 30b is a continuous rating in the DU characteristic 30.

A FC characteristic 31 indicated by a dotted line indicates characteristics of the voltage and electric power in the output power from the fuel cell 101 when the voltage control unit that boosts the output power from the fuel cell 101 is provided. As indicated by the FC characteristic 31, the output power from the fuel cell 101 has a characteristic that the voltage decreases as the electric power increases. This characteristic is common not only to the fuel cell 101 but also to a general power supply. In the example of the FC characteristic 31, the continuous rating 30b of the DU characteristic 30 is provided by boosting the output power from the fuel cell 101 by the voltage control unit.

As shown in FIGS. 1 and 2, a FC characteristic 32 indicates the characteristics of the voltage and the electric power in the output power from the fuel cell 101 when the voltage control unit that boosts the output power from the fuel cell 101 is not provided and the number of cells of the fuel cell 101 is increased as compared with the example of the FC characteristic 31. As indicated by the FC characteristics 31 and 32, the voltage of the output power from the fuel cell 101 can be increased by increasing the number of cells. According to the FC characteristic 32, the continuous rating 30b of the DU characteristic 30 can be provided.

A BATT assist characteristic 33 indicated by a dashed arrow extending from the FC characteristic 32 indicates an assist characteristic by the secondary battery 102 and the voltage control unit 103 (see FIG. 1) connected in parallel with the fuel cell 101. As indicated by the BATT assist characteristic 33, by connecting the secondary battery 102 and the voltage control unit 103 in parallel with the fuel cell 101, the voltage of the drive power supplied to the DU 10 remains the voltage of the FC characteristic 32, and the electric power of the drive power supplied to the DU 10 is added by the amount of the output power from the secondary battery 102.

However, even with the BATT assist characteristic 33, the voltage of the drive power supplied to the DU 10 cannot be increased. Therefore, in the first state in which the fuel cell 101 is connected in parallel with the secondary battery 102 and the voltage control unit 103, the motive power of the electric vehicle 1 can be obtained only up to the continuous rating 30b, and a voltage shortage 34 indicated by an alternate long and short dash line arrow occurs with respect to the maximum rating 30a of the DU characteristic 30.

In contrast, when the required output value for the DU 10 (motor generator 11) is larger than an output value of the continuous rating 30b, the ECU 115 of the present embodiment controls the switch 104 to be in the second state in which the fuel cell 101 is connected in series with the secondary battery 102 and the voltage control unit 103. Accordingly, the voltage obtained by the secondary battery 102 and the voltage control unit 103 can be added to the voltage indicated by the FC characteristic 32. Therefore, it is possible to provide the maximum rating 30a of the DU characteristic 30.

In contrast, when the required output value for the DU 10 is equal to or less than the output value of the continuous rating 30*b*, the ECU 115 controls the switch 104 to be in the first state in which the fuel cell 101 is connected in parallel with the secondary battery 102 and the voltage control unit 103. Accordingly, the continuous rating 30*b* of the DU characteristic 30 is provided, and the output power of the fuel cell 101 is not always boosted, so that the drive power can be supplied to the DU 10 with high energy efficiency.

<Voltage Change of Drive Power Due to Switching of Switch 104>

Figure 4:
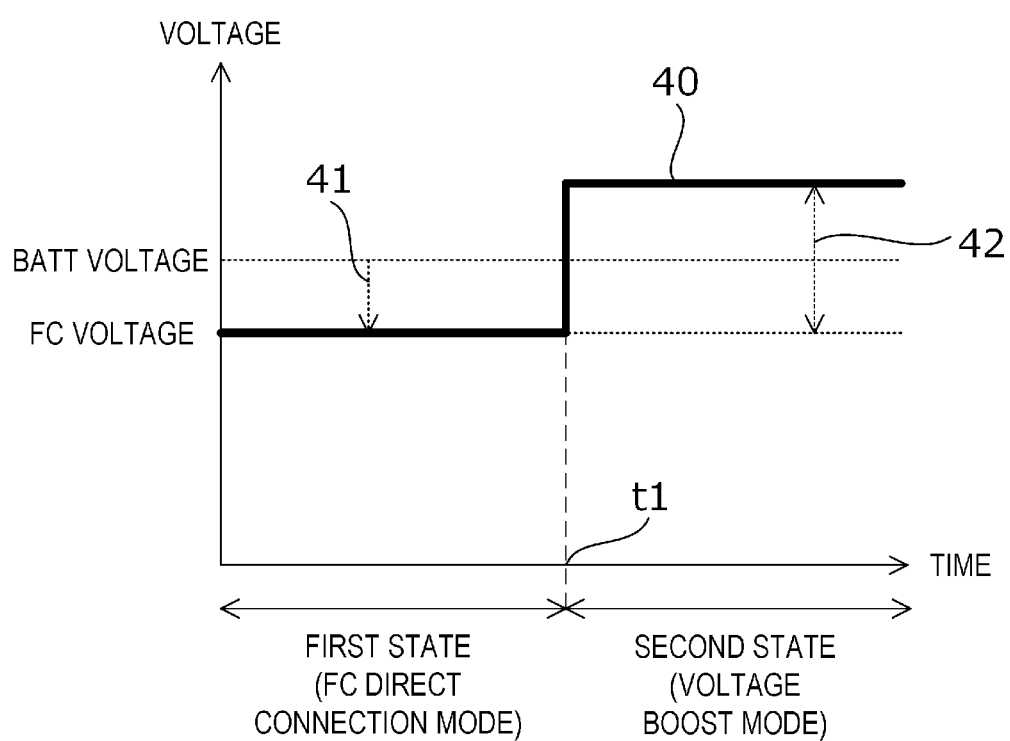
FIG. 4 shows an example of a voltage change of drive power due to switching of a switch 104.

FIG. 4 shows an example of a voltage change of drive power due to switching of the switch 104. In FIG. 4, a horizontal axis represents time, and a vertical axis represents voltage. A supply voltage 40 indicates the voltage of the drive power supplied from the power supply system 100 to the DU 10. FIG. 4 shows an example in which the ECU 115 controls the switch 104 to switch from the first state (FC direct connection mode) to the second state (voltage boost mode) at time t1.

A FC voltage on the vertical axis indicates an output voltage of the fuel cell 101. A BATT voltage on the vertical axis indicates an output voltage of the secondary battery 102.

In the first state, the fuel cell 101 is connected in parallel with the secondary battery 102 and the voltage control unit 103, and the supply voltage 40 is equal to the output voltage of the fuel cell 101 (FC voltage). At this time, the voltage control unit 103 performs step-down 41 of lowering the output power of the secondary battery 102 to the FC voltage.

In the second state, the fuel cell 101 is connected in series with the secondary battery 102 and the voltage control unit 103, and the supply voltage 40 is obtained by adding the output voltage (FC voltage) of the fuel cell 101, the output voltage (BATT voltage) of the secondary battery 102, and an amount of voltage change by the voltage control unit 103. Accordingly, it is possible to supply drive power having a voltage higher than that in the first state to the DU 10. A difference 42 between the supply voltage 40 in the first state and the supply voltage 40 in the second state is variable in a range of 0 to BATT voltage.

<Circuit Configuration of Power Supply System 100>

Figure 5:
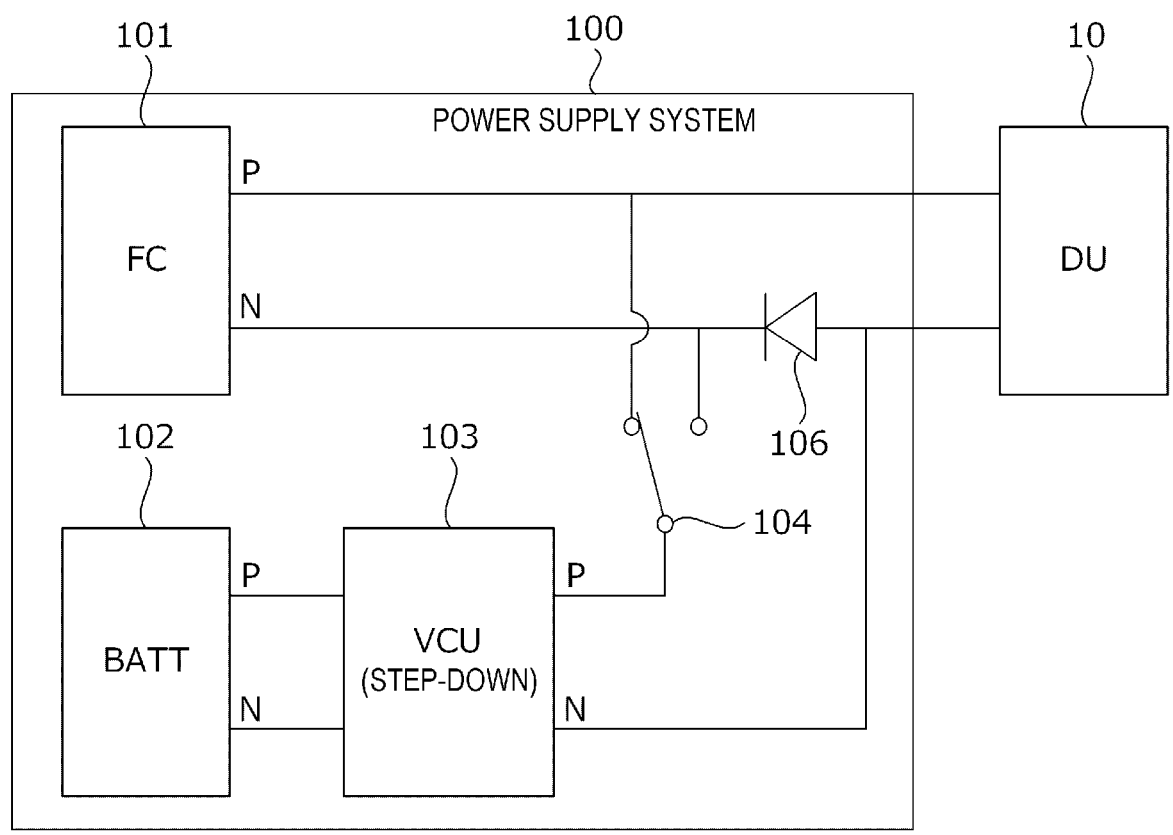
FIG. 5 is a diagram showing an example of a circuit configuration of the power supply system 100.
Figure 6:
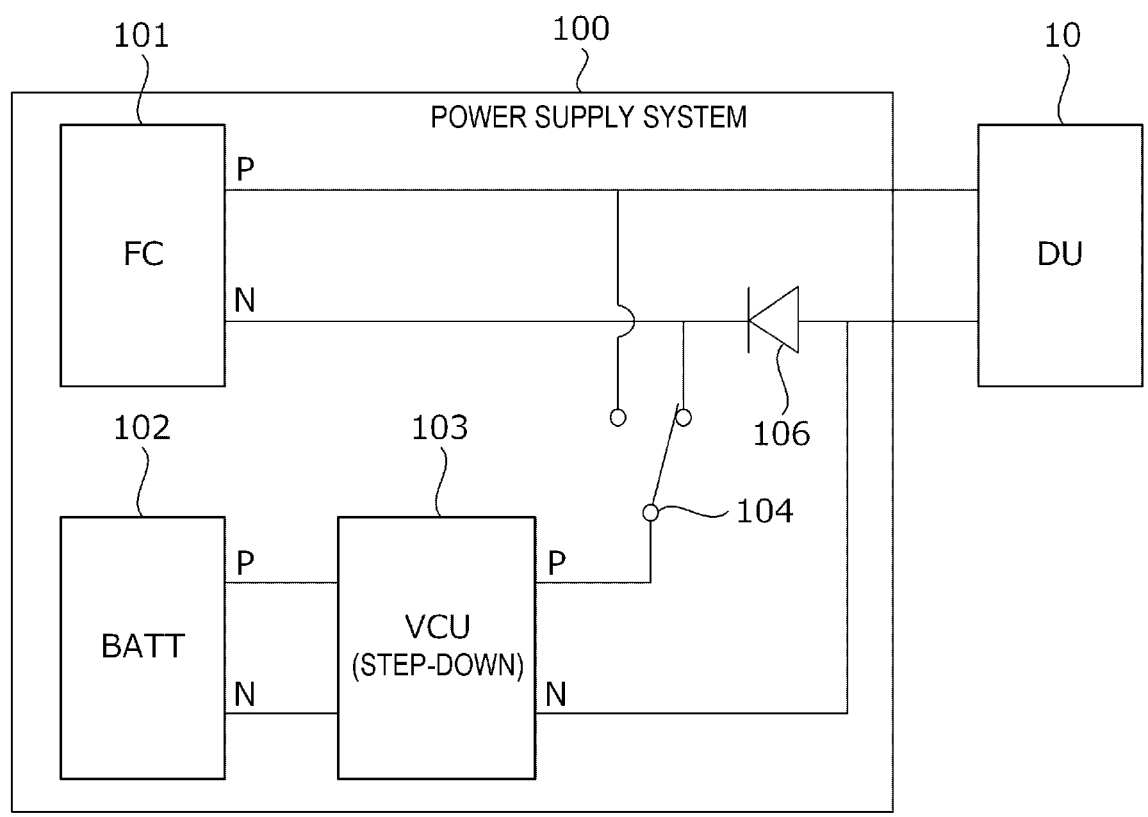
FIG. 6 is a diagram showing the example of the circuit configuration of the power supply system 100.

FIGS. 5 and 6 show an example of a circuit configuration of the power supply system 100. In the example of FIGS. 5 and 6, the power supply system 100 includes a diode 106 in addition to the configuration shown in FIGS. 1 and 2. In FIG. 5, the ECU 115 is not shown. In FIGS. 5 and 6, "P" and "N" of an output terminal of each block indicate a positive electrode (in other words, high potential side) and a negative electrode (in other words, low potential side) of the output terminal of the block. FIG. 5 shows the first state, and FIG. 6 shows the second state.

The diode 106 is provided between the DU 10 and a negative electrode of the fuel cell 101 so that a current flows only in a direction from the DU 10 to the fuel cell 101. The negative electrode of the voltage control unit 103 is connected between the DU 10 and the diode 106.

An input terminal of the switch 104 is connected to a positive electrode of the voltage control unit 103. The switch 104 has two output terminals, one output terminal is connected between the positive electrode of the fuel cell 101 and the DU 10, and the other output terminal is connected between the negative electrode of the fuel cell 101 and the diode 106.

As shown in FIG. 5, when the switch 104 connects the positive electrode of the voltage control unit 103, the positive electrode of the fuel cell 101, and the DU 10, this state is the first state in which the fuel cell 101 is connected in parallel with the secondary battery 102 and the voltage control unit 103.

As shown in FIG. 6, when the switch 104 connects the positive electrode of the voltage control unit 103, the negative electrode of the fuel cell 101, and the diode 106, this state is the second state in which the fuel cell 101 is connected in series with the secondary battery 102 and the voltage converter 103. In this state, the diode 106 is provided so that a current from the positive electrode of the voltage control unit 103 does not flow to the negative electrode of the voltage control unit 103 and the DU 10.

<Configuration Example of Voltage Control Unit 103 and Switch 104>

Figure 7:
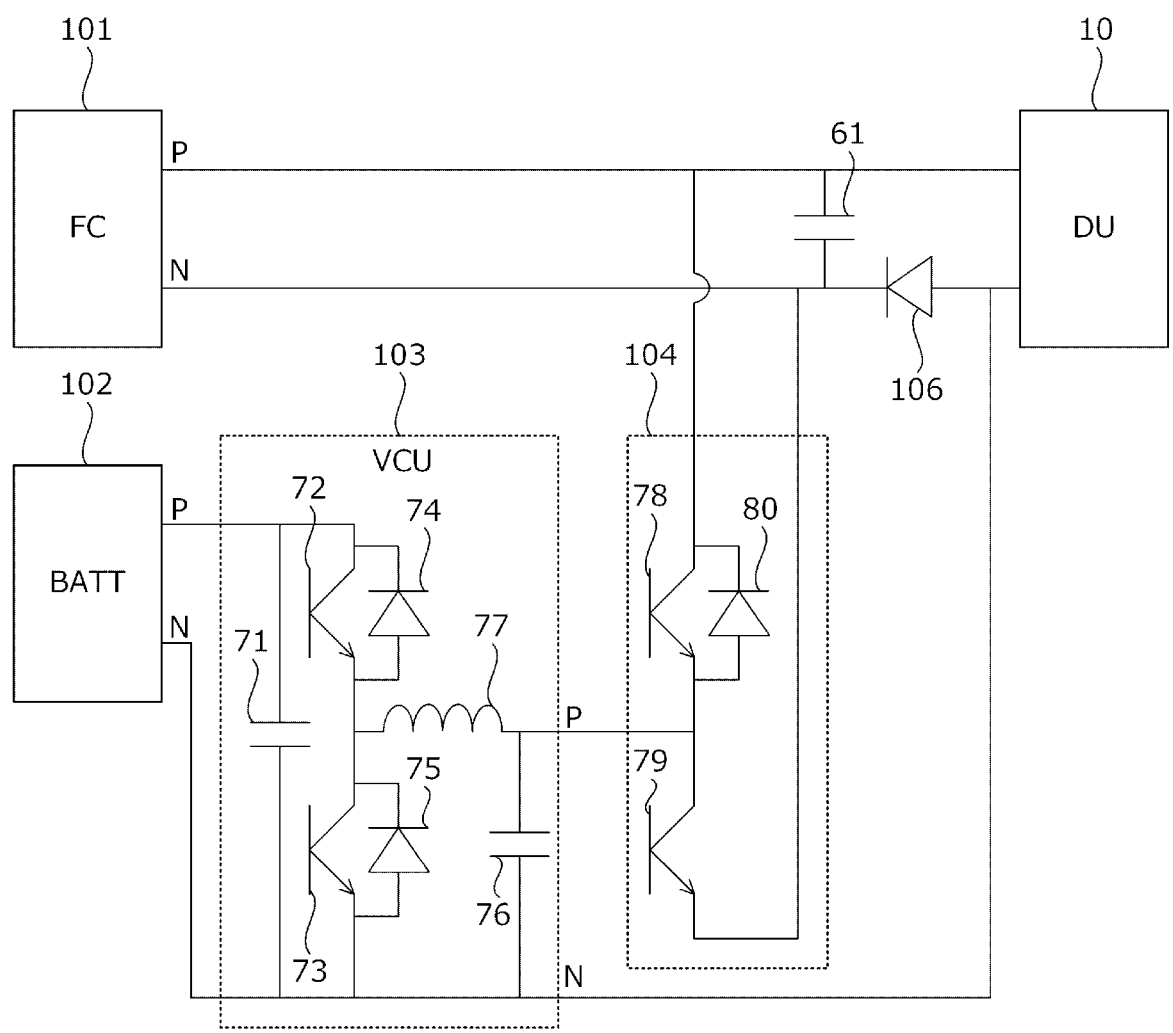
FIG. 7 shows a configuration example of a voltage control unit 103 and the switch 104.

FIG. 7 shows a configuration example of the voltage control unit 103 and the switch 104. The voltage control unit 103 shown in FIG. 7 is a one-phase circuit using a step-down chopper. Specifically, the voltage control unit 103 shown in FIG. 7 includes a capacitor 71, transistors 72 and 73, diodes 74 and 75, a capacitor 76, and a coil 77.

The capacitor 71 has a first terminal connected to a positive electrode of the secondary battery 102 and a second terminal connected to a negative electrode of the secondary battery 102. The transistors 72 and 73 are connected in series with each other and in parallel with the capacitor 71. The diodes 74 and 75 are connected in parallel to the transistors 72 and 73, respectively.

The coil 77 has a first terminal connected between the transistors 72 and 73, and a second terminal connected to the positive electrode of the voltage control unit 103. The capacitor 76 has a first terminal connected between the coil 77 and the positive electrode of the voltage control unit 103, and a second terminal connected to the negative electrode of the voltage control unit 103. The negative electrode of the secondary battery 102, the second terminal of the capacitor 71, an output terminal of the transistor 73, and the second terminal of the capacitor 76 are connected to the negative electrode of the voltage control unit 103.

As shown in FIG. 7, the switch 104 includes, for example, transistors 78 and 79 and a diode 80. The transistor 78 has a first terminal connected to the positive electrode of the voltage control unit 103 and a second terminal connected between the positive electrode of the fuel cell 101 and the DU 10. The transistor 79 has a first terminal connected to the positive electrode of the voltage control unit 103 and a second terminal connected between the negative electrode of the fuel cell 101 and the diode 106. The diode 80 is connected in parallel with the transistor 78. A diode is not connected in parallel to the transistor 79.

The ECU 115 switches between the first state and the second state by switching on and off of the transistors 78 and 79. Specifically, the first state is set when the transistor 78 is turned on and the transistor 79 is turned off, and the second state is set when the transistor 78 is turned off and the transistor 79 is turned on.

In the example of FIG. 7, a capacitor 61 is provided in the power supply system 100. The capacitor 61 has a first terminal connected between the positive electrode of the fuel cell 101 and the DU 10, and a second terminal connected between the negative electrode of the fuel cell 101 and the diode 106.

<Another Configuration Example of Voltage Control Unit 103>

Figure 8:
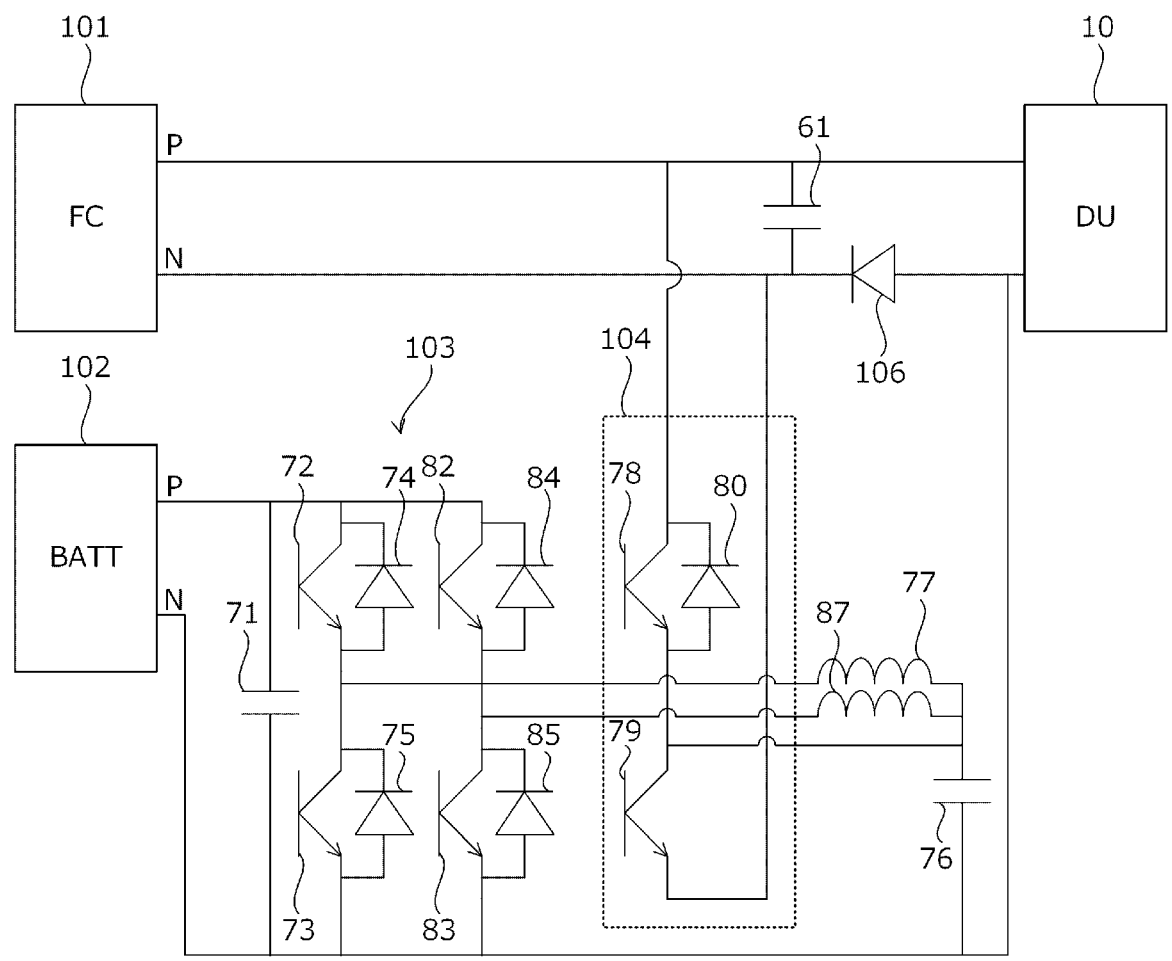
FIG. 8 shows another configuration example of the voltage control unit 103.

FIG. 8 shows another configuration example of the voltage control unit 103. The voltage control unit 103 shown in FIG. 8 is a two-phase magnetic coupling circuit in which two step-down choppers are connected in parallel. Specifically, in addition to the voltage control unit 103 shown in FIG. 7, the voltage control unit 103 shown in FIG. 8 includes transistors 82 and 83, diodes 84 and 85, and a coil 87, which are step-down choppers similar to the transistors 72 and 73, the diodes 74 and 75, and the coil 77 (step-down chopper).

Similarly to the transistors 72 and 73, the transistors 82 and 83 are connected in series with each other and in parallel with the capacitor 71. The diodes 84 and 85 are connected in parallel to the transistors 82 and 83, respectively. The coil 87 has a first terminal connected between the transistors 82 and 83, and a second terminal connected to the positive electrode of the voltage control unit 103, that is, between the transistors 78 and 79 of the switch 104.

<Still Another Configuration Example of Voltage Control Unit 103>

Figure 9:
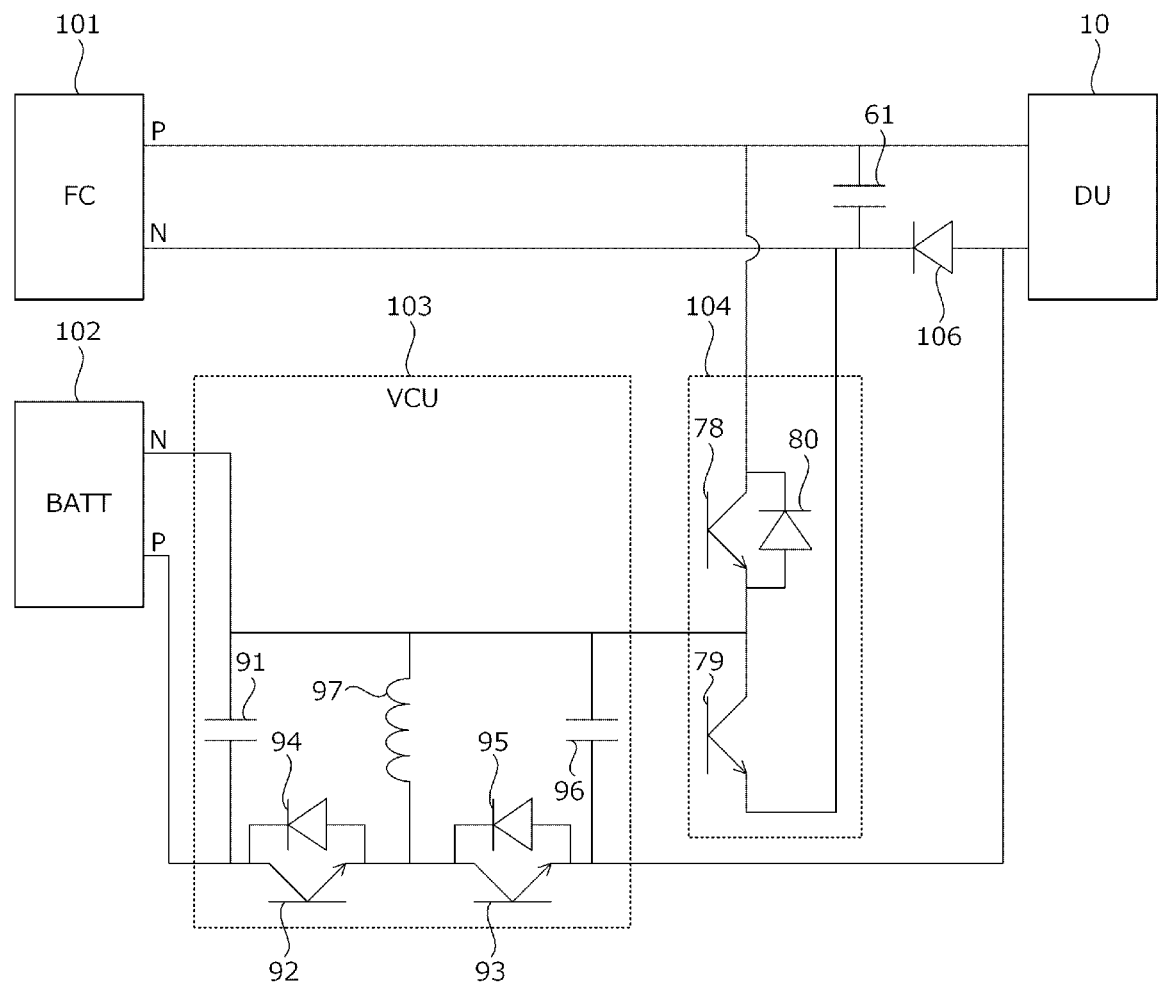
FIG. 9 shows still another configuration example of the voltage control unit 103.

FIG. 9 shows still another configuration example of the voltage control unit 103. The voltage control unit 103 is not limited to the configurations shown in FIGS. 7 and 8, and may have a configuration shown in FIG. 9. The voltage control unit 103 shown in FIG. 9 is a circuit using a step-up and step-down chopper. Specifically, the voltage control unit 103 shown in FIG. 9 includes a capacitor 91, transistors 92 and 93, diodes 94 and 95, a capacitor 96, and a coil 97. In the configuration of the voltage control unit 103 shown in FIG. 9, the positive electrode and the negative electrode of the secondary battery 102 are inverted with respect to the configurations shown in FIGS. 7 and 8. In the voltage control unit 103 shown in FIG. 9, switching between the first state and the second state is possible even when the output voltage (BATT voltage) of the secondary battery 102 is low.

Although the embodiment of the present invention has been described above, the present invention is not limited to the above embodiment, and modifications, improvements, and the like can be made as appropriate. The above embodiment may be appropriately modified, improved, or the like. For example, the configuration in which the voltage control unit 103 steps down the output voltage of the secondary battery 102 has been described, but the present invention is not limited to such a configuration. For example, when the voltage control unit 103 has the configuration shown in FIG. 9, the voltage control unit 103 may be configured to boost the output voltage of the secondary battery 102.

Although the control for switching between the first state and the second state based on the required output value for the motor generator 11 has been described, the present invention is not limited to such control. For example, when the power supply system 100 is in the first state, the ECU 115 may control the switch 104 to be in the second state under a condition of overlapping the output voltage (FC voltage) of the fuel cell 101 and the output voltage (BATT voltage) of the secondary battery 102. Accordingly, in a state in which the fuel cell 101 is connected in parallel with the secondary battery 102 and the voltage control unit 103, there is no voltage difference between the FC voltage and the BATT voltage, and it is possible to avoid difficulty in voltage control by the voltage control unit 103.

Although the driving operation of supplying the drive power from the power supply system 100 to the motor generator 11 to generate the motive power of the electric vehicle 1 has been mainly described, the ECU 115 may control the switch 104 to be in the second state in the regenerative operation of storing the regenerative power from the motor generator 11 in the secondary battery 102. Accordingly, during the regenerative operation, the drive power can be supplied to the DU 10 with high energy efficiency as the first state. During the regenerative operation, the diode 106 operates so that the regenerative power from the DU 10 does not flow to the fuel cell 101 but flows to the secondary battery 102.

Although the configuration in which the diode 106 is provided between the negative electrode of the fuel cell 101 and the DU 10 has been described, the diode 106 may be replaced with an on/off switch. In this case, the ECU 115 performs control to turn on the on/off switch in the first state and turn off the on/off switch in the second state.

The present specification describes at least the following matters. Although the corresponding components or the like in the above embodiment are shown in parentheses, the present invention is not limited thereto.

(1) A power supply system (power supply system 100) connected to a motor unit (motor generator 11) of an electric vehicle (electric vehicle 1), the power supply system includes:

a fuel cell (fuel cell 101);
a secondary battery (secondary battery 102);
a voltage control unit (voltage control unit 103); and
a switch (switch 104), in which
the fuel cell is directly connected to the motor unit,
the secondary battery is connected to the motor unit via the voltage control unit, and
the switch is configured to switch between a first state in which the secondary battery and the voltage control unit are connected in parallel with the fuel cell and a second state in which the secondary battery and the voltage control unit are connected in series with the fuel cell.

According to (1), the voltage control unit that boosts the output power from the fuel cell is not provided, so that the manufacturing cost and the weight of the power supply system can be suppressed. Since the first state and the second state can be switched by the switch, it is possible to supply the drive power with high energy efficiency or supply the high-voltage drive power, and it is possible to improve the supply performance of the drive power of the power supply system 100.

(2) The power supply system according to (1), in which the switch switches between the first state and the second state in accordance with a required output value for the motor unit.

According to (2), it is possible to switch between the first state in which the drive power can be supplied with high energy efficiency and the second state in which the high-voltage drive power can be supplied, in accordance with the required output value to the motor unit.

(3) The power supply system according to (2), in which the switch is switched to the first state when the required output value is less than a predetermined value, and the switch is switched to the second state when the required output value is equal to or greater than the predetermined value.

According to (3), when the required output value for the motor unit is not high, the first state can be set, and the drive power can be supplied with high energy efficiency. When the required output value for the motor unit is high, the second state can be set, and the high-voltage drive power can be supplied.

The invention claimed is:

1. A power supply system connected to a motor unit of an electric vehicle, the power supply system comprising:
a fuel cell;
a secondary battery;
a voltage control unit; and
a switch, wherein:

the fuel cell is directly connected to the motor unit;
the secondary battery is connected to the motor unit via the voltage control unit; and
the switch is configured to switch between a first state in which the secondary battery and the voltage control unit are connected in parallel with the fuel cell and a second state in which the secondary battery and the voltage control unit are connected in series with the fuel cell.

2. The power supply system according to claim 1, wherein the switch switches between the first state and the second state in accordance with a required output value for the motor unit.

3. The power supply system according to claim 2, wherein:
the switch is switched to the first state when the required output value is less than a predetermined value; and
the switch is switched to the second state when the required output value is equal to or greater than the predetermined value.

\* \* \* \* \*